(12) United States Patent
Deininger (10) Patent No.: US 9,780,480 B2
(45) Date of Patent: Oct. 3, 2017

(54) PLUG-AND-SOCKET DEVICE

(71) Applicant: SMW-Autoblok Spannsysteme GmbH, Meckenbeuren (DE)

(72) Inventor: Harald Deininger, Friedrichshafen (DE)

(73) Assignee: SMW-Autoblok Spannsysteme GmbH, Meckenbeuren (DE)

( * ) Notice: Subject to any disclaimer, the term of this patent is extended or adjusted under 35 U.S.C. 154(b) by 0 days.

(21) Appl. No.: 15/080,727

(22) Filed: Mar. 25, 2016

(65) Prior Publication Data

US 2016/0285196 A1    Sep. 29, 2016

(30) Foreign Application Priority Data

Mar. 27, 2015 (EP) .................................... 15161271

(51) Int. Cl.
| | |
|---|---|
| H01R 13/62 | (2006.01) |
| H01R 13/52 | (2006.01) |
| B23B 31/00 | (2006.01) |
| B23Q 1/00 | (2006.01) |
| H01R 13/629 | (2006.01) |

(52) U.S. Cl.
CPC ............. *H01R 13/52* (2013.01); *B23B 31/00* (2013.01); *B23Q 1/0009* (2013.01); *H01R 13/629* (2013.01)

(58) Field of Classification Search
CPC ......... H01R 13/52; B23B 31/00; B23B 19/02; B23Q 11/00

USPC ......................................................... 439/152
See application file for complete search history.

(56) References Cited

U.S. PATENT DOCUMENTS

| | | | |
|---|---|---|---|
| 2010/0035450 A1* | 2/2010 | Chang .................. | H01R 13/635 439/152 |
| 2016/0285196 A1* | 9/2016 | Deininger .............. | H01R 13/52 |

FOREIGN PATENT DOCUMENTS

| | | |
|---|---|---|
| DE | 200 09 486 | 10/2001 |
| JP | S62 277237 | 12/1987 |

\* cited by examiner

*Primary Examiner* — Abdullah Riyami
*Assistant Examiner* — Nader Alhawamdeh
(74) *Attorney, Agent, or Firm* — Pandiscio & Pandiscio (57) ABSTRACT

In an electrical plug-and-socket device for transferring electrical energy from an external source of current to an electrical load arranged in a body, preferably in a chuck body of a chuck, in particular an electrical drive motor for actuating the clamping jaws of the chuck, consisting of: —a socket possessing at least two accommodation openings, a body and an electrical load arranged therein, each of which is connected to the source of current via an electrical cable and of at least two plugs connected to the load by one electrical cable each, with the plugs arranged in the body and coupled to the particular accommodation openings of the socket during the electrical energy transfer, and in which the plugs can be removed from the accommodation openings following the energy transfer, and automatic plug-and-socket connection should be created.

15 Claims, 8 Drawing Sheets

PLUG-AND-SOCKET DEVICE

REFERENCE TO PENDING PRIOR PATENT APPLICATION

This patent application claims benefit of European Patent Application No. 15 161 271.0, filed Mar. 27, 2015, which patent application is hereby incorporated herein by reference.

FIELD OF THE INVENTION

The present invention relates to a plug-and-socket device for transferring electrical energy in accordance with the pre-characterising clause of patent claim 1.

BACKGROUND OF THE INVENTION

The process of transferring electrical energy from a source of current to an electrical load using a plug-and-socket device is adequately known. However, such an energy transfer is problematic if the connection of the plug-and-socket device must be carried out by automated means, for example on a machine tool or the like, because in such a case it is necessary to ensure that the coupling procedures can be generated by the machine and take place according to a specified control sequence.

Furthermore, not only are such plug-and-socket devices used on a machine tool in the area of the loading station, but together with the body at least parts of the plug-and-socket device enter a machining area of the machine tool where chips, contaminated water and other impurities occur, by means of which the parts of the plug-and-socket device arranged in the body become contaminated or suffer partial or irreparable damage with the effect that a correct coupling procedure can no longer be guaranteed for the plug-and-socket device.

JP S 62 277237 discloses an electrical plug-and-socket device which transfers electrical energy from an external source of current to a load arranged on a shaft and makes it possible for data to be transferred. As a result of their susceptibility to contamination, plug-and-socket devices of this kind suffer from the aforementioned disadvantages.

SUMMARY OF THE INVENTION

Therefore, it is the task of the present invention to develop a plug-and-socket device of the aforementioned type in such a way that the coupling procedure between the plugs and the particular opening of the socket provided for this purpose, which are spatially separate from one another, takes place automatically. Moreover, the interfaces, and in particular the transitional areas, should seal the components in the body of the plug-and-socket device with a water and/or air-tight seal to prevent the ingress of contamination or damage.

These tasks are carried out in accordance with the present invention by the features of the characterising clause of patent claim 1.

Other advantageous further embodiments of the present invention are derived from the subordinate claims.

For the reasons that the socket can be moved in the direction of the body by means of a first advance device, that a holding pocket is worked into or provided in the body into which the first advance device can be inserted with the socket, that the body has a chamber provided in it which opens into the holding pocket, that the chamber has a second advance device mounted in it in a movable arrangement with a free end pointing towards the holding pocket on which the plugs are arranged, and that the advance movement of the second advance devices brings the plugs into active contact with one each of the accommodation openings of the socket for transferring electrical energy and for generating the coupled status, and with the second advance device withdrawing the plugs at the end of the energy transmission and for the purpose of uncoupling from the particular accommodation opening of the socket, the situation is reliably achieved that the coupling of the plugs with the corresponding accommodation openings of the socket can be achieved by automated means within a specified time interval.

It is particularly advantageous if the advance movement of the first advance device takes place prior to the advance movement of the second advance device, because this guarantees that the socket will already be positioned in the body, meaning that the plugs can subsequently be placed in the corresponding accommodation openings of the socket.

For this purpose, the chamber in which the second advance device is arranged in a movable arrangement should run at right angles to the holding pocket into which the first advance device engages.

Furthermore, in a further advantageous embodiment of the present invention, the second advance device can be actuated by means of a third advance device which can be actuated in the housing in which the first advance device is also arranged. The second advance device has a slanted plane which interacts in a driving active contact with a slanted plane provided on the third advance device. When, accordingly, the third advance device is moved in the direction of the second advance device, the alignment of the slanted plane causes the second advance device to be moved in the direction of the holding pocket, and thus the plugs are moved in the direction of the accommodation openings of the socket. The body accommodates a chuck for holding workpieces that are transferred from the loading and unloading station into a machining zone of a machine tool and contamination occurs in the area of the machining zone in the form of chips, contaminated water and other particles, as a result of which it is particularly advantageous if the opening of the holding pocket is provided with a water and/or an air-tight seal as long as the body is arranged in the area of the machining zone of a machine tool. For this purpose, the opening of the holding pocket is sealed by means of a sealing cover which is mounted in an axially moving arrangement on the holding pocket. When the first advance device engages, the sealing cover is pressed in the direction of a base of the holding pocket, meaning that the socket is positioned in the area of the chamber. The sealing cover has a U-shaped cross section and accommodates a coil compression spring in one area that is supported at the opposite end on the base of the holding pocket.

As soon as the first advance device has been pulled out of the holding pocket, the coil compression spring presses the sealing cover into the initial position in the area of the opening of the holding pocket with the effect that the sealing cover provides a flush seal with the outside of the body. Furthermore, the sealing cover acts as a stop in the pressed-in condition because it can be regarded as a spacer as a result of its U-shaped cross sectional contour. This is because the sealing cover makes contact with the base of the holding pocket and terminates approximately in the area where the chamber opens out into the holding pocket, meaning that the first advance device enters into contact with the sealing cover as soon as the movement of the first advance device into the holding pocket has stopped, as soon as the socket is positioned opposite the chamber.

In order to blow or flush away possible adhesions of chips, particles and other impurities in the area of the opening of the holding pocket and/or in the interface area between the second and third advance devices, blowing openings are provided in the housing in which the first and third advance devices are arranged, which direct a flow of air and/or liquid in the direction of the interfaces between the second and third advance devices and the opening of the holding pocket, or transfer such a flow to these positions, with the effect that the impurities adhering there can be removed.

Proximity switches provided on the first and third advance devices also enable the distance from the first and third advance devices to the particular components arranged in the body to be monitored and controlled. This information and the timing sequence in which the first and third advance devices are activated is provided and undertaken by a control unit.

BRIEF DESCRIPTION OF THE DRAWINGS

The drawing shows two sample embodiments of a plug-and-socket device configured in accordance with the present invention, the details of which are explained below. In the drawing.

DETAILED DESCRIPTION OF THE INVENTION

Figure 1:
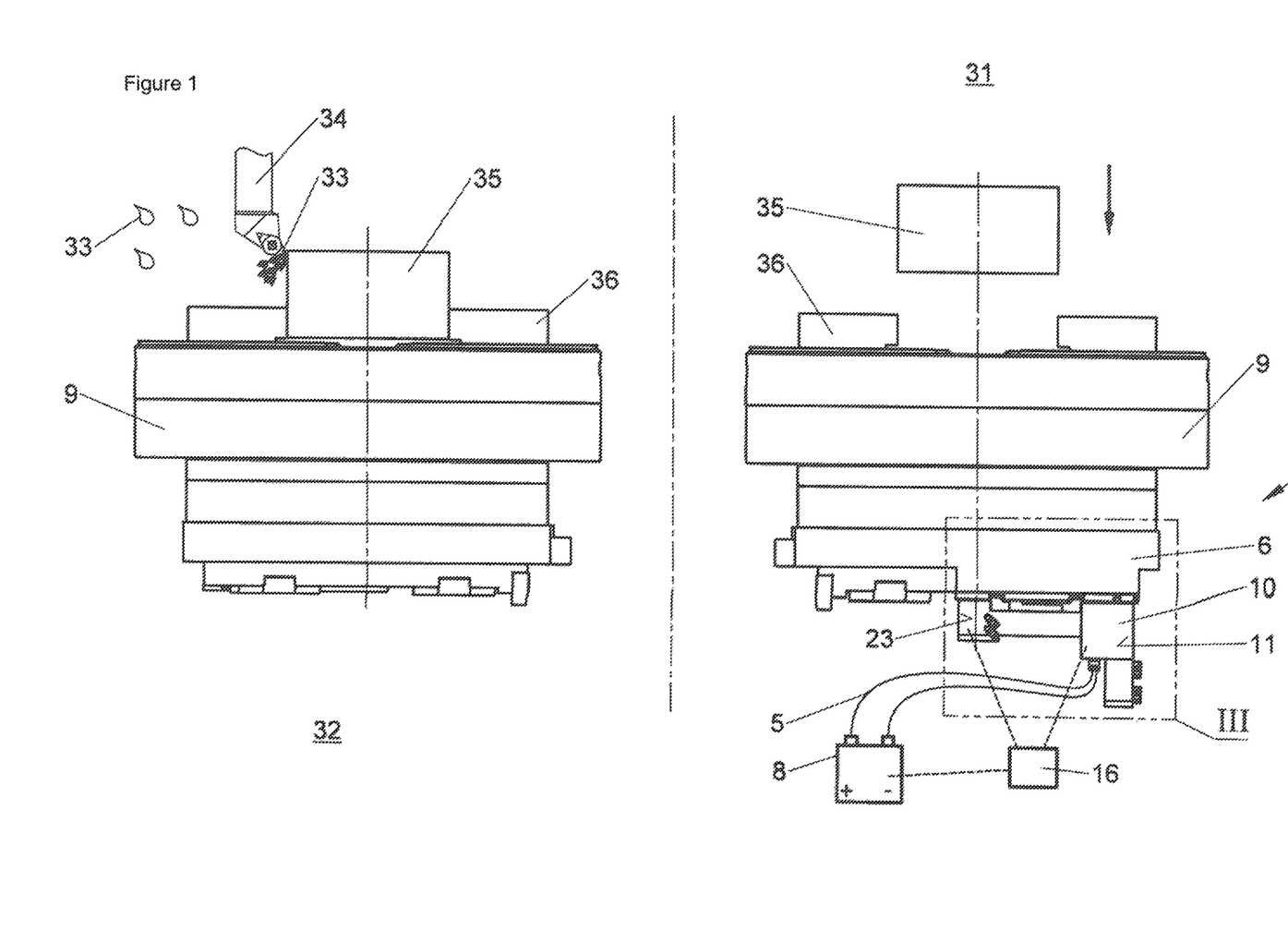
FIG. 1 shows a first sample embodiment of a plug-and-socket device for transferring electrical energy from a source of current to an electrical load arranged in a chuck, by means of which the clamping jaws of the chuck can be advanced and locked in a loading and unloading station as well as in a machining zone of a machine tool, as a sectional view in each case.

FIG. 1 shows a plug-and-socket device 1 by means of which an electrical load, for example a drive motor 7, is to be electrically connected to a source of current 8. The drive motor 7 in this case is arranged spatially separated from the source of current 8 in a body 6, for example a chuck body 6 of a chuck 9.

The drive motor 7 should enable the clamping jaws 36 assigned to the chuck 9 and mounted in it in a movable arrangement not only to be advanced but also to be held in their locking position so as to clamp a workpiece 35. The loading and unloading zone of a machine tool is identified by the reference number 31.

A machine tool indicated schematically in the form of a tool 34 is intended to machine the workpiece 35 clamped in a machining zone 32 by cutting operations. Such machining procedures can be carried out, for example, by turning, milling, drilling or the like.

In order to provide electrical power to the drive motor 7, it must be given adequate electrical energy during the loading and unloading time via the plug-and-socket device 1. As soon as the workpiece 35 is locked in the chuck 9, it should be transferred or swivelled to the machining zone 32. In order to permit movement of the chuck 9 out of the loading and unloading zone 31, this means the plug-and-socket device 1 must be configured in such a way that the electrical components assigned to the body 6 of the chuck 9 must be able to be spatially separated from the electrical components of the plug-and-socket device 1 that are connected to the source of current 8.

Furthermore, the machining procedures on the workpiece 35 give rise to contamination, for example in the form of chips 36, contaminated water, hydraulic fluid and the like. Consequently, during the machining procedure, the body 6 and the electrical components installed therein should be encapsulated so they are water and air-tight, with the effect that the contamination 36 cannot reach the electrical components of the plug-and-socket device 1.

Figure 2:
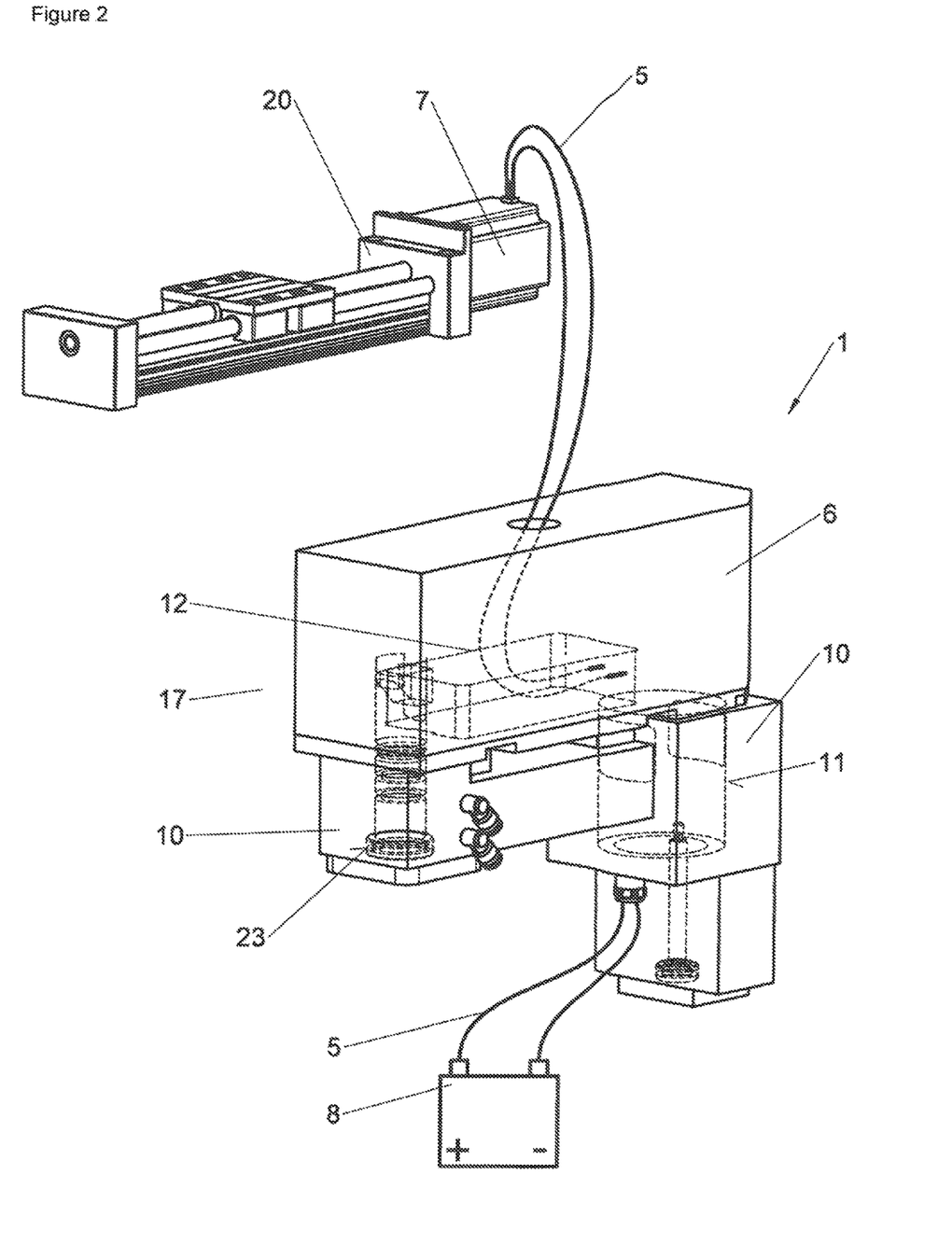
FIG. 2 shows a second sample embodiment of a plug-and-socket device for transferring electrical energy from a source of current to an electrical load arranged in a flange, by means of which a clamping device in the form of a vice is driven, as a sectional view.

FIG. 2 shows that the plug-and-socket device 1 can also be used in a flange 17. By means of electrical cables 5, the plug-and-socket device 1 of the flange 17 is connected to the electric drive 7, by means of which a vice 20 or another clamping device, for example, can be actuated.

Figure 3:
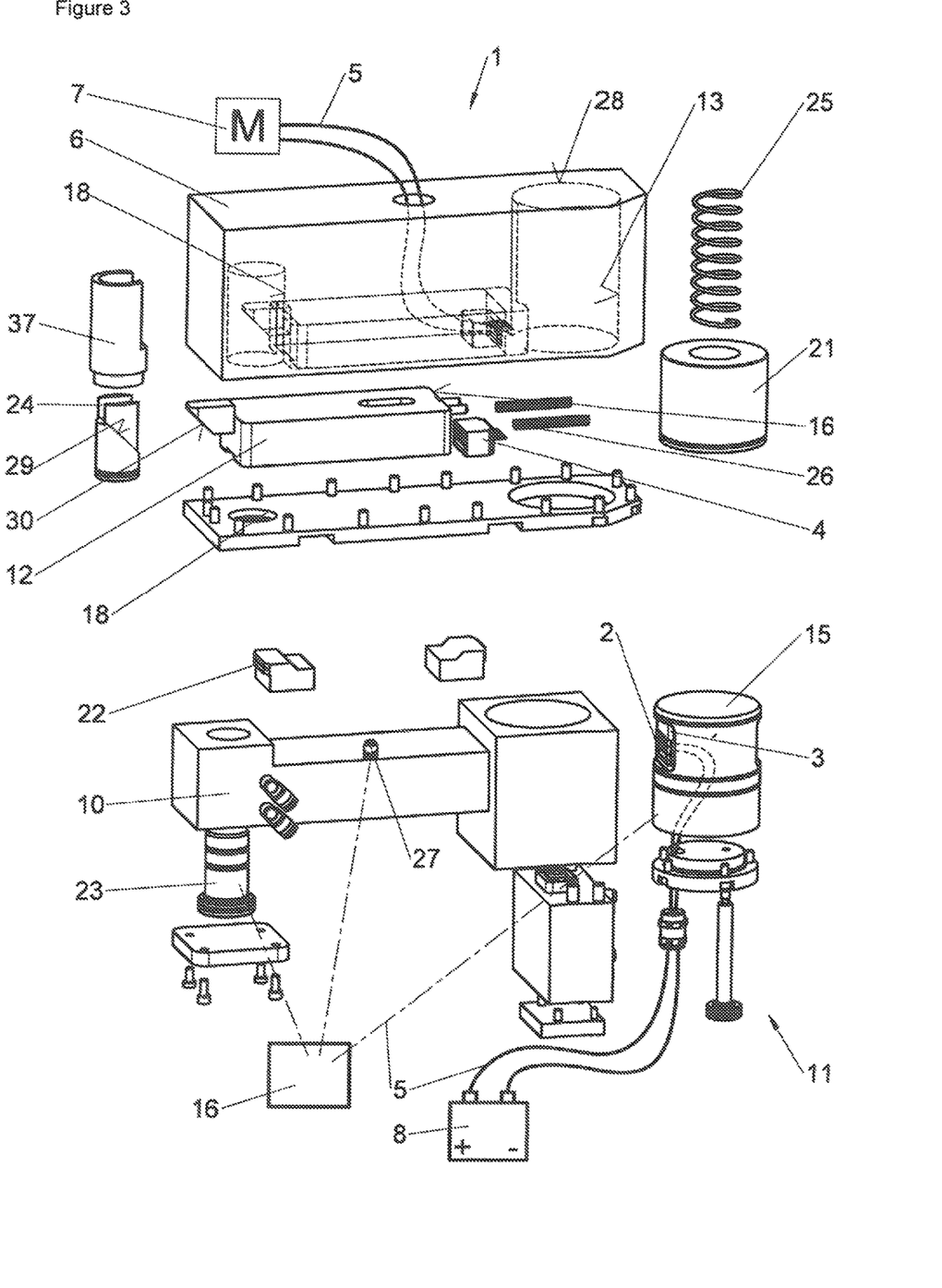
FIG. 3 shows the individual parts of one of the plug-and-socket devices in accordance with FIG. 1 or 2, in the removed condition, in particular a first advance device on the free face end of which a socket with accommodation openings is mounted, with a second advance device mounted in a sliding arrangement in a body of the chuck or the flange with at least two plugs facing the accommodation opening of the socket, and with a third advance device by means of which the second advance device can be actuated.

Both embodiments of FIGS. 1 and 2 share the design structure explained more specifically below that can be seen in detail in FIG. 3 in the form of an exploded view. The plug-and-socket device 1 in this case consists of a socket 2 with at least two accommodation openings 3 that serve as socket positions and for electrical coupling. In this case, the particular accommodation openings 3 are electrically connected to the source of current 8 via electrical cables 5.

The socket 2 is attached to a first advance device 11 which is configured as a pneumatically operated piston. The socket 2 is provided on a free face end of the piston 11 that can be advanced in the direction of the body 6 or the flange 17 as shown in FIG. 1 or 2. In order to mount the first advance device 11, it is arranged in a housing 10 which is attached in a locationally fixed and spatially separated arrangement with regard to the body 6.

The body 6 has a chamber 14 worked into or provided in it, in which a second advance device 12 in the form of a pin or rod is mounted in an axially moving arrangement. The chamber 14 opens out into a holding pocket 13 worked into the body 6. The lengthways axis of the holding pocket 13 and the lengthways axis of the chamber 14 are at right angles to one another.

At least two plugs 4 are attached to the free face end of the second advance device 12 facing towards the holding pocket 13, meaning that the plugs 4 project in the direction of the holding pocket 13.

Furthermore, a third advance device 23 is arranged in an axially moving arrangement in the housing 10 at a spatial distance from the first advance device 11, and the third advance device 23 is pneumatically operated. It is configured as a piston that can be moved in the direction of the body 6.

The driving active connection between the third and second advance devices 23 and 12 can be achieved, in principle, in two ways. Firstly, the free end of the third advance device 23 can act directly on the free end of the second advance device 12 which points towards a passage opening 18 worked into the body 6. The contact surface identified as the interface between the two advance devices 12 and 23 is configured as slanted planes 29 and 30 running in parallel and in contact with one another such that when the third advance device 23 is advanced, the second advance device 12 is moved axially in the direction of the holding pocket 13.

In order to close the passage opening 18 with an air and/or water-tight seal, it has a sealing sleeve 37 inserted in it in an axially moving arrangement. The sealing sleeve 37 moreover acts as a transmission element for the advance movement of the third advance device 23 onto the second advance device 12, and specifically in such a way that an intermediate element of 24 is attached between the sealing sleeve 37 and the free end of the second advance device 12. Not only the sealing sleeve 37 but also the intermediate element 24 possesses the particular slanted planes 29 and 30 which slide along one another in a previously explained manner as soon as the sealing sleeve 37 is pushed into the body 6 by the third advance device 23. The advance movement of the sealing sleeve 37 namely moves the intermediate element 24 and thus the second advance device 12 in the direction of the holding pocket 13.

When the third advance device 23 is moved into the body 6 and into the chamber 14, the two slanted planes 29 and 30 either of the third advance device 23 and the second advance device 12 or of the sealing sleeve 37 come into contact with the intermediate element 29, and slide along one another in a relative movement. The inclination of the two slanted planes 29 and 30 in this case runs parallel and at an angle to the lengthways axis of the second advance device 12 in such a way that the movement of the third advance device 23 causes the second advance device 12 to be moved or pushed in the direction of the holding pocket 13.

In order to provide the body 6 with an air and water-tight closure or seal, especially during the machining procedure in the machining zone 32, the holding pocket 13 has a sealing sleeve 37 and intermediate element 24 assigned to it, which are supported by means of a coil compression spring 25.

The coil compression spring 25 of the sealing cover 21 lies on or against a base 28 of the holding pocket 13 and on the inside of the sealing cover 21. The sealing cover 21 has a U-shaped cross-section, with the effect that an area of the coil compression spring 25 is enclosed by the sealing cover 21. Furthermore, the outsides of the sealing cover 21 form a cylindrically shaped outer jacket surface that provide a guide on the inside wall of the holding pocket 13 corresponding to the outer contour of the sealing cover 21. As a result, the sealing cover 21 can be pushed along the inside wall of the holding pocket 13 in a guided manner when the first advance device 11 engages in the holding pocket 13.

In order to establish the active connection between the third and the second advance device 23 or 12, the passage opening 18 is worked into the body 6 in the area of the third advance device 23, with the effect that the free face end of the third advance device 23 enters into a direct driving connection by its slanted plane 30 with the slanted plane 29 of the second advance device 12 or the sealing sleeve 37 is pressed into the body 6 by the third advance device 23, as a result of which the second advance unit 12 can be moved. The second advance device 12 closes the passage hole 18 in the initial condition, meaning that no dirt particles 36 enter the body 6 through the passage hole 18. At most, such particles 36 can settle on the slanted plane 29 and will be flushed off by compressed air or a flow of liquid before the third advance device 23 is brought into active contact with the second advance device 12 again. The first and the third advance devices 11 and 23 run in parallel and spaced apart from one another within the housing 10 and are operated by means of a control unit 16.

Moreover, one proximity switch 27 each is attached to the first and third advance devices 11 or 23 in order to measure the gap between them and the bodies 6. The proximity switch 27 is connected to the control unit 16 and generates electrical switching signals by means of which any advance movements of the advance devices 11 and 23 are stopped if the bodies 6 are not correctly aligned in relation to the housing 10.

Figure 4A:
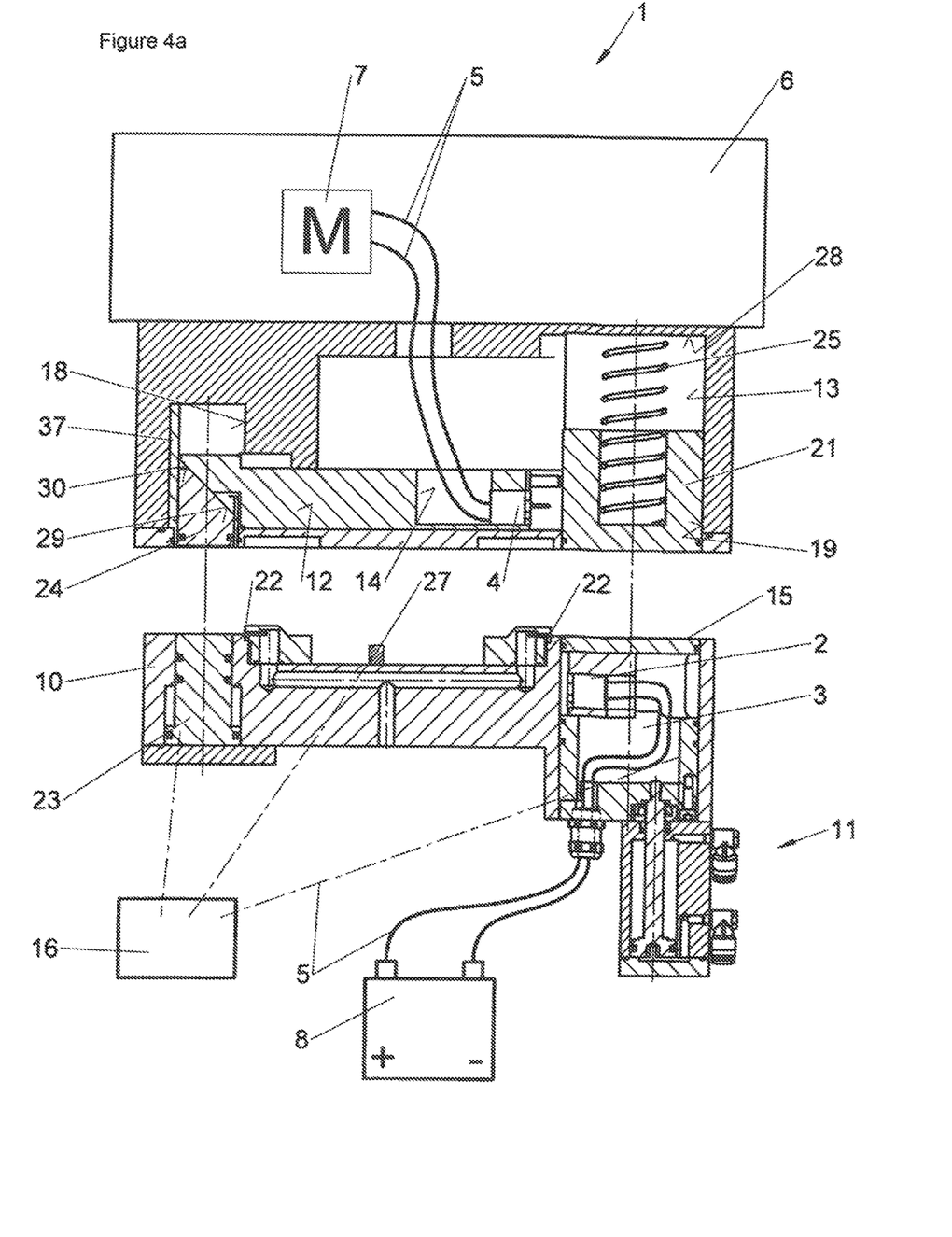
FIG. 4a shows the plug-and-socket device in accordance with FIG. 3 in the assembled condition and in the initial position, as a sectional view.

FIG. 4a shows the initial condition of the plug-and-socket device 1. The body 6 is spatially separated from the housing 10. The three advance devices 11, 12 and 23 are not actuated, with the effect that the first and third advance devices 11 and 23 are completely moved into the housing 10, the second advance device 12 closes the passage opening 18 and the plugs 4 attached to it are at a distance from the holding pocket 13. Furthermore, the sealing cover 21 is arranged flush in the opening 19 of the holding pocket 13 so that the holding pocket 13 is sealed thereby with an air or water-tight seal. The sealing cover 21 is positioned so as to be axially movable by means of the coil compression spring 25.

Figure 4B:
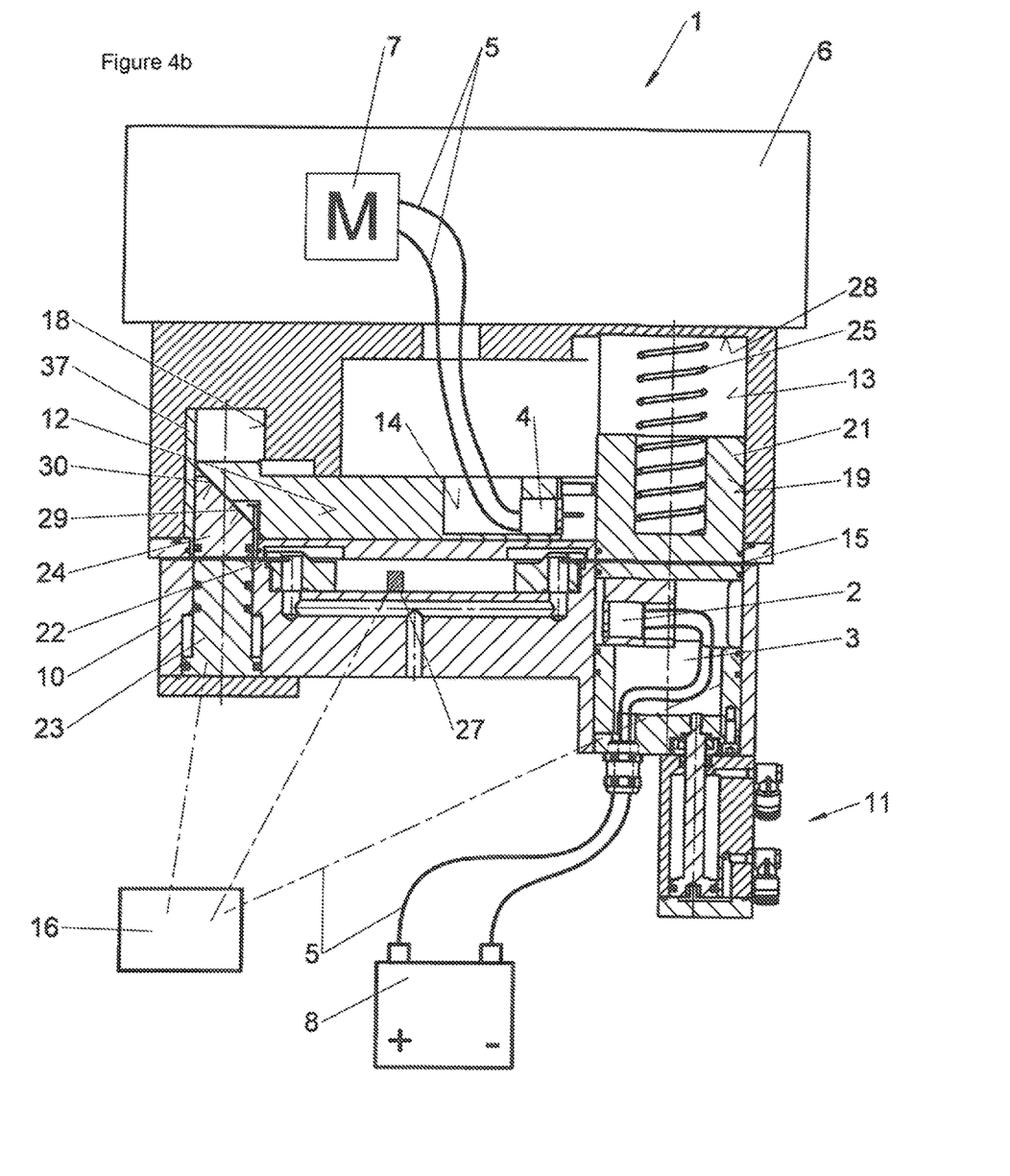
FIG. 4b shows the plug-and-socket device in accordance with FIG. 4a in the contact condition between a housing accommodating the socket and the body or flange.
Figure 4C:
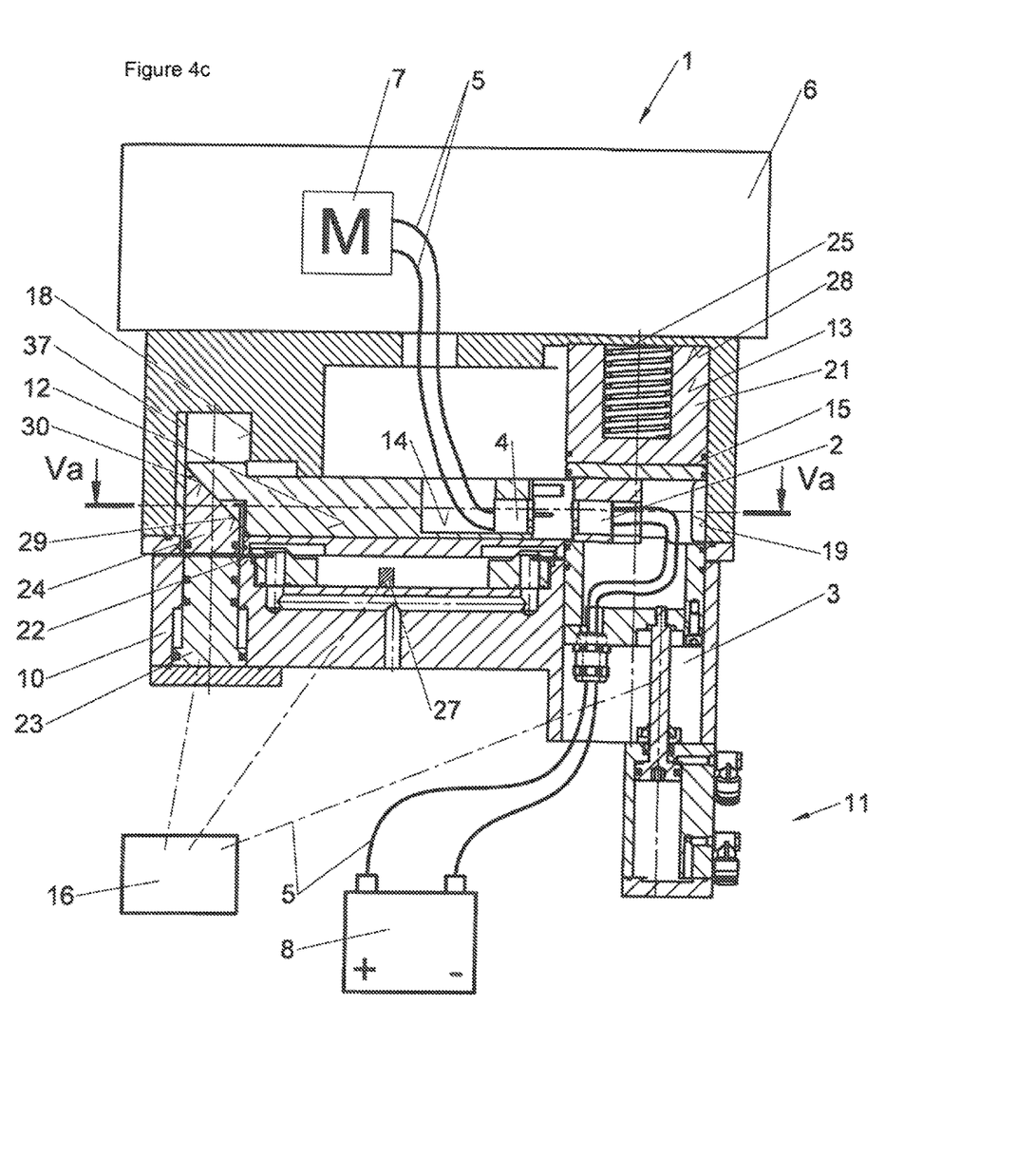
FIG. 4c shows the plug-and-socket device in accordance with FIG. 4b, in which the first advance device with the socket has moved into the body or flange.

FIG. 4b shows the contact condition between the body 6 and the housing 10 of the plug-and-socket device 1. Accordingly, the body 6 is placed on the locationally fixed housing 10 and the holding pocket 13 runs flush with the first advance device 11, while the passage opening 18 in the area of the chamber 14 of the body is positioned flush with the third advance device 23. As a result, the first advance device 11 can move or be moved in the direction of the holding pocket 13 and the third advance device 23 in the direction of the passage opening 18 of the chamber without their movement sequences being obstructed because the sealing cover 21 is pushed by the first advance device 11 in the direction of the base 28 of the holding pocket 13 and the first advance device 11 together with the socket 2 attached to it enters the holding pocket 13 as shown in FIG. 4c. The accommodation openings 3 of the socket 2 can be placed flush with the chamber 14 for holding the plugs 4.

The sealing cover 21 has a U-shaped cross section, as a result of which its circumferential leg enters into active contact with the base 28 of the holding pocket 13 and thus forms a spacer or a stop for the first advance device 11, with the effect that the movement of the first advance device 11 is limited by the sealing cover 21. The length of the sealing cover 21 is designed in such a way that the first advance device 11 can indeed enter or move into the holding pocket 13, although the socket 2 can only be moved as far as the transitional area between the chamber 14 and the holding pocket 13. As a result, the socket 2 is flush with the chamber 14 for generating a coupling status for the electrical connection between the socket 2 and the plugs 4.

Figure 4D:
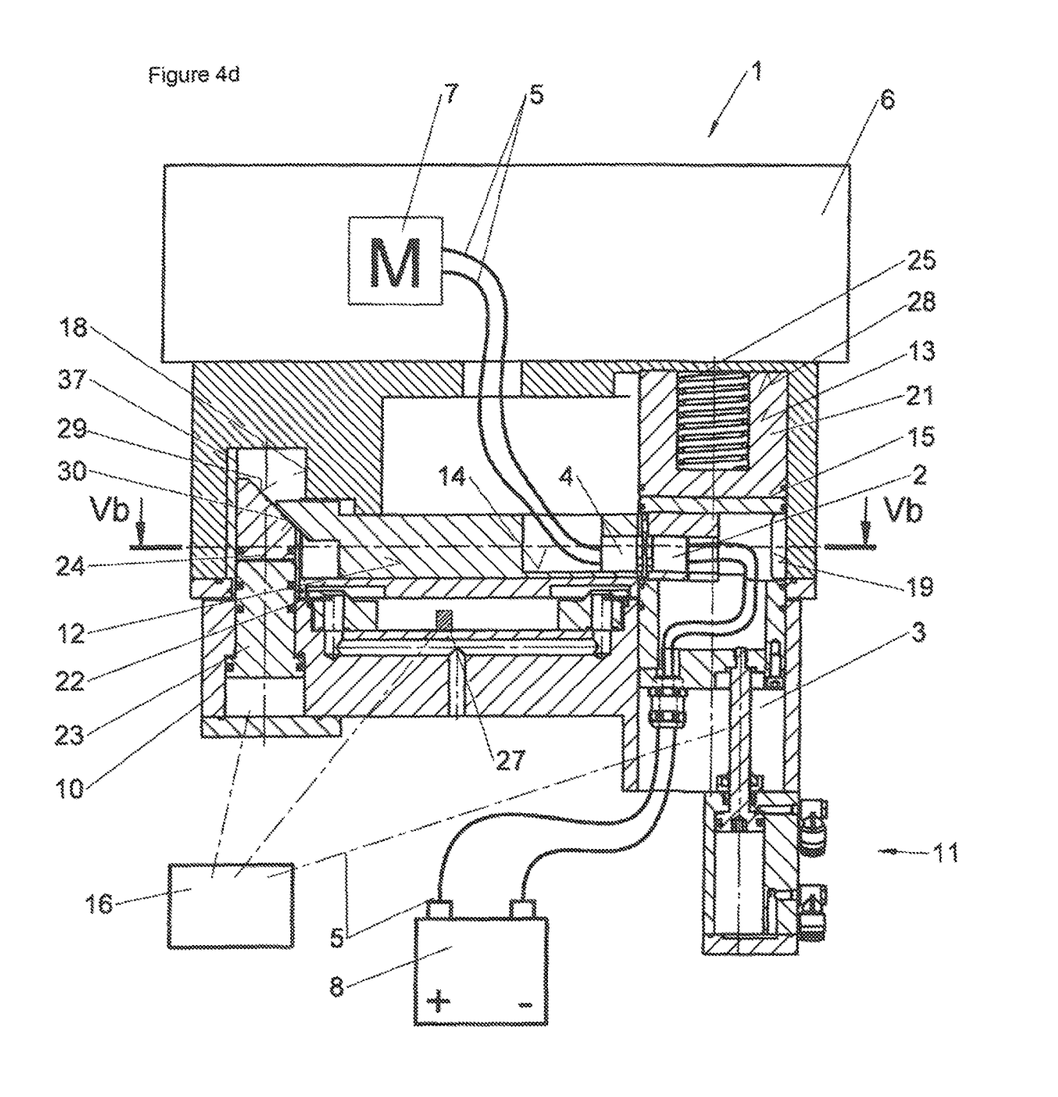
FIG. 4d shows the plug-and-socket device in accordance with FIG. 4c in which both the first and the third advance devices have moved into the body and in which the second advance device has been moved in the direction of the socket in order to generate a coupling condition between the plugs and the accommodation openings of the socket.

FIG. 4d shows the actuation of the second advance device 12 by the third advance device 23. As soon as the first advance device 11 is positioned in an oriented position in the body 6, and accordingly the accommodation openings 3 of the socket 2 are pointing in the direction of the plugs 4, the third advance device 23 is actuated, with the effect that it is moved in the direction of the passage opening 18 of the chamber 14. Consequently, the slanted planes 29 and 30 of the third and second advance device 23 or 12 come into active contact, which causes the second advance device 12 to be moved in the direction of the accommodation openings 3 of the socket 2, with the result that the plugs 4 attached to it engage in the accommodation openings 3 and consequently an electrical connection is established between the socket 2 and the plugs 4. In this position, referred to as the coupling status or the status for the electrical energy transfer, the electrical drive 7 can be supplied with adequate energy or electrical voltage sufficient to carry out the necessary advance movement and locking of a chuck 9 or a pressure cylinder of a vice 20 or of another clamping device or the like.

As soon as the workpiece 35 has been released from the body 6 or the flange 17 and an unmachined workpiece 35 has been positioned back on it, the coupling status between the plugs 4 and the accommodation openings 3 of the socket 2 can be disconnected. This is done in reverse order. First, accordingly, the third advance device 23 is moved into the housing 10. A further coil compression spring 26 assigned to the second advance device 12 and interacting with it removes this and thus also the plugs 4 from the socket 2. Next, the first advance device 11 can be pulled back into the housing 10. The coil compression spring 25 subsequently causes the sealing cover 21 to move in the direction of the opening 19 of the holding pocket 13, with the effect that it is closed before the body 6 is transferred to the machining zone 32.

Figure 5A:
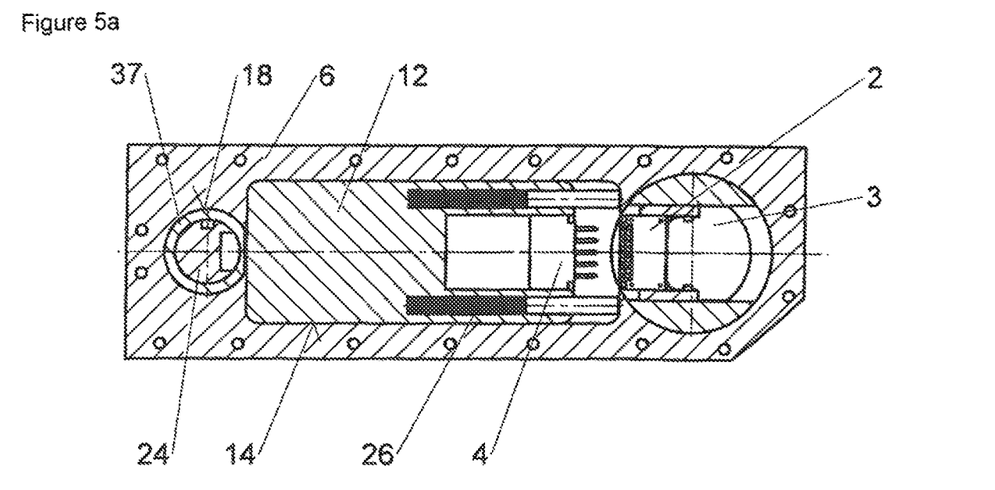
FIG. 5a shows a section through the plug-and-socket device in accordance with FIG. 4c along the section line Va/Va and FIG. 5b shows the plug-and-socket device as a sectional view according to FIG. 4d along the section line Vb/Vb.
Figure 5B:
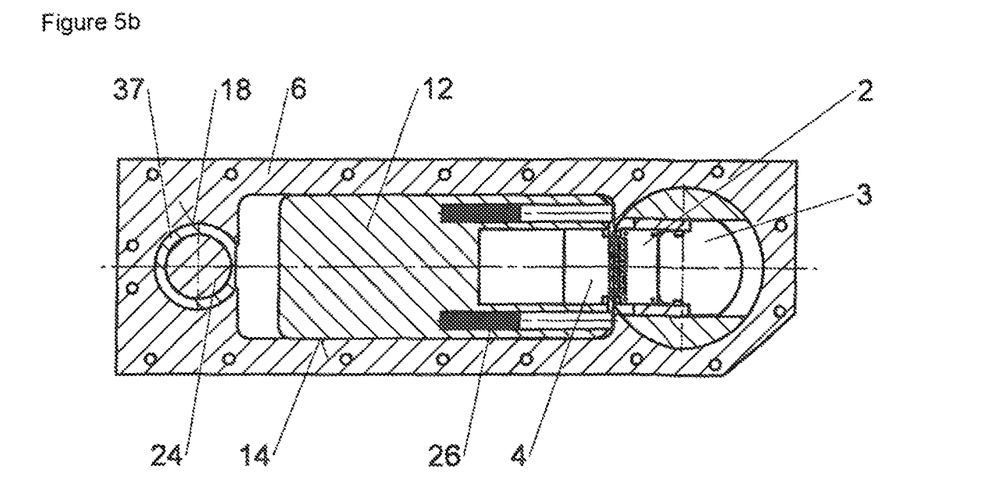

FIGS. 5a and 5b show in detail how the second advance device 12 is mounted in the chamber 14 and in what way the slanted plane 29 of the second advance device 12 is inclined in order for this to be able to move axially in the direction of the accommodation opening 13.

What is claimed is:

1. An electrical plug-and-socket device (1) for transferring electrical energy from an external source of current (8) to an electrical load (7) arranged in a body (6), preferably in a chuck body (6) of a chuck (9), in particular an electrical drive motor (7) for actuating the clamping jaws of the chuck (9),
consisting of:
a socket (2) possessing at least two accommodation openings (3), a body (6) and an electrical load (7) arranged therein, each of which is connected to the source of current (8) via an electrical cable (5) and at least two plugs (4) connected to the load (7) by one electrical cable (5) each, with the plugs (4) arranged in the body (6) and coupled to the particular accommodation openings (3) of the socket (2) during the electrical energy transfer, and in which the plugs (4) can be removed from the accommodation openings (3) following the energy transfer,
characterised in that,
the socket (2) can be moved in the direction of the body (6) by means of a first advance device (11), that the body (6) has a holding pocket (13) worked into it or provided in it, into which the first advance device (11) can be inserted with the socket (2), that the body (6) has a chamber (14) which opens into the holding pocket (13), that the chamber (14) has a second advance device (12) mounted on it in a moving arrangement on which the plugs (4) are arranged on a free face end (16) of the second advance device (12) facing towards the holding pocket (13), and that the advance movement of the second advance device (12) brings the plugs (4) into active contact with one each of the accommodation openings (3) of the socket (2) for electrical energy transfer and for generating the coupling status, and by means of which the second advance device (12) pulls the plugs (4) out of the particular accommodation opening (3) of the socket (2) for decoupling at the end of the energy transfer.

2. The plug-and-socket device (1) in accordance with claim 1,
characterised in that,
the movements of the first and second advance devices (11, 12) are synchronised in relation to one another in such a way that to create the coupling status between the accommodation openings (3) and the plugs (4), the socket (2) is first positioned in the body (6) by the first advance device (11), and then the plugs (4) are pushed by the second advance device (12) in the direction of the socket (2).

3. The plug-and-socket device (1) in accordance with claim 1,
characterised in that,
the holding pocket (13) and the chamber (14) run at right angles to one another in the body (6).

4. The plug-and-socket device (1) in accordance with claim 1,
characterised in that,
the first advance device (11) is arranged in a housing (10), that a third advance device (23) is provided in the housing (10) at a distance from the first advance device (11), with the third advance device (23) running parallel to the first advance device (11) and in a driving, active connection with the second advance device (12) in order to activate it for movement.

5. The plug-and-socket device (1) in accordance with claim 4,
characterised in that,
the first and third advance devices (11, 23) are configured as pneumatically or hydraulically operated pistons or tubes that can be pushed one inside the other in a telescopic arrangement, that the second advance device (12) is configured as a rod or pin, and that the first and third advance devices (11, 23) can be activated and monitored by a control unit (16).

6. The plug-and-socket device (1) in accordance with claim 4,
characterised in that,
the second and third advance devices (12, 23) are in direct contact with one another and form an interface, or that a sealing sleeve (37) is arranged between the second and third advance devices (12, 23) which is in a driving, active connection with the second and third advance devices (12, 23) and forms an interface.

7. The plug-and-socket device (1) in accordance with claim 6,
characterised in that, a slanted plane (29, 30) is provided in each case at the interface between the second and third advance devices (12, 23), that the slanted planes (29, 30) run parallel to one another or run between the sealing sleeve (37) and the second advance device (12) and are arranged in the direction of the advance movement of the second advance device (12) in such a way that the movement of the third advance device (23) causes the axial advance movement of the second advance device (12) in the direction of the holding pocket (13) directly or via the sealing sleeve (37).

8. The plug-and-socket device (1) in accordance with claim 1,
characterised in that,
the holding pocket (13) can be provided with an air and/or water-tight seal by means of a sealing cover (21) and that the advance movement of the first advance device (11) enables the sealing cover (21) to be moved into the holding pocket (13) in such a way that the chamber (14) opening into the holding pocket (13) is released.

9. The plug-and-socket device (1) in accordance with claim 8,
characterised in that,
a coil compression spring (25) is provided between the sealing cover (21) and a base (28) of the holding pocket (13), by means of which the sealing cover (21) can be moved in the direction of an opening (29) of the holding pocket (13).

10. The plug-and-socket device (1) in accordance with claim 9,
characterised in that,
the sealing cover (21) has a U-shaped cross-section, that the open face end of the U-shaped sealing cover (21) points towards the base (28) of the holding pocket (13), and that the coil compression spring (25) engages with the cross-sectional profile of the sealing cover (21) in some areas.

11. The plug-and-socket device (1) in accordance with claim 9,
characterised in that,
the sealing cover (21) is used as a spacer between the base (28) of the holding pocket (13) and the chamber (14), and that the movement of the first advance device (11) is limited by the sealing cover (21).

12. The plug-and-socket device (1) in accordance with claim 4,
characterised in that,
the housing (10) has one or more blower openings (22) worked into it, through which an air and/or liquid flow can be generated in the direction of openings (18, 19, 22) of the holding pocket (13) or of the chamber (14).

13. The plug-and-socket device (1) in accordance with claim 4,
characterised in that,
the first and/or third advance device (11 or 23) has/have a proximity switch (27) arranged for it/them, by means of which the distance between the first or third advance device (11 or 23) and the body (6) can be determined, and that the particular proximity switch (27) is electrically connected to the control unit (16).

14. The plug-and-socket device (1) in accordance with claim 4,
characterised in that,
the body (6) for generating the coupling condition is positioned in such a way in relation to the housing (10) that the holding pocket (13) is arranged flush with the first advance device (11) and the third advance device (23) is arranged flush with the free end of the second advance device (12).

15. The plug-and-socket device (1) in accordance claim 9,
characterised in that,
the second advance device (12) interacts with a coil compression spring (26) arranged between the holding pocket (13) and the free end of the second advance device (12) that is opposite to the holding pocket (13), and that a passage opening (18) can be sealed with an air and/or water-tight seal by means of a sealing sleeve (37).

* * * * *